United States Patent
Matsumoto et al.

(10) Patent No.: US 7,886,314 B2
(45) Date of Patent: Feb. 8, 2011

(54) DISK DEVICE, SHUTTER CONTROL DEVICE, AND COMPUTER PROGRAM FOR SHUTTER OPENING/CLOSING CONTROL

(75) Inventors: Hiroyuki Matsumoto, Saitama (JP); Takeshi Matsumoto, Saitama (JP); Katsunori Tamamura, Saitama (JP); Takao Yoshida, Saitama (JP); Fumito Inaba, Saitama (JP); Makoto Ikehata, Saitama (JP)

(73) Assignee: Pioneer Corporation, Tokyo (JP)

( * ) Notice: Subject to any disclaimer, the term of this patent is extended or adjusted under 35 U.S.C. 154(b) by 757 days.

(21) Appl. No.: 11/886,881

(22) PCT Filed: Mar. 27, 2006

(86) PCT No.: PCT/JP2006/306191

§ 371 (c)(1),
(2), (4) Date: Sep. 21, 2007

(87) PCT Pub. No.: WO2006/104113

PCT Pub. Date: Oct. 5, 2006

(65) Prior Publication Data

US 2008/0247084 A1    Oct. 9, 2008

(30) Foreign Application Priority Data

Mar. 28, 2005   (JP) .............................. 2005-092750

(51) Int. Cl.
G11B 33/02   (2006.01)
(52) U.S. Cl. .................................... 720/646
(58) Field of Classification Search ................ 720/646
See application file for complete search history.

(56) References Cited

U.S. PATENT DOCUMENTS

| | | | | |
|---|---|---|---|---|
| 4,733,314 A | * | 3/1988 | Ogawa et al. | 360/99.07 |
| 5,062,100 A | * | 10/1991 | Verhoeven et al. | 720/740 |
| 5,224,079 A | * | 6/1993 | Inoue | 369/13.21 |
| 5,784,351 A | * | 7/1998 | Takagi | 720/647 |
| 5,933,291 A | | 8/1999 | Kanazawa et al. | |
| 6,535,471 B2 | | 3/2003 | Shinoda et al. | |
| 6,809,903 B2 | | 10/2004 | Bagnell et al. | |
| 2005/0041054 A1 | | 2/2005 | Kawaguchi | |
| 2008/0052733 A1 | | 2/2008 | Kuo et al. | |

FOREIGN PATENT DOCUMENTS

| | | |
|---|---|---|
| JP | 3-242856 A | 10/1991 |
| JP | 2001-101744 A | 4/2001 |

OTHER PUBLICATIONS

U.S. Appl. No. 11/887,100, filed Sep. 25, 2007 Matsumoto et al.
Hiroyuki Matsumoto et al., USPTO Notice of Allowance, 11/887,100, Sep. 8, 2010, 9 pages.

* cited by examiner

*Primary Examiner*—Mark Blouin
(74) *Attorney, Agent, or Firm*—Foley & Lardner LLP

(57) ABSTRACT

To assuredly determine whether a shutter pinches a disk in a disk device including a shutter at a disk insertion slot. A shutter control device 10 includes a pinch determining unit 14 that determines whether the disk is pinched by the shutter based on a position of the shutter during a process of closing the shutter, and a sensitivity changing unit that sets sensitivity of determination to be high as ambient temperature of a shutter driving mechanism increases.

16 Claims, 14 Drawing Sheets

| T m | $T_1$ | $T_2$ | $T_3$ |
|---|---|---|---|
| m≦M | $\alpha_{11}$ | $\alpha_{12}$ | $\alpha_{13}$ |
| m>M | $\alpha_{21}$ | $\alpha_{22}$ | $\alpha_{23}$ |

| T | $T_1$ | $T_2$ | $T_3$ |
|---|---|---|---|
| $\alpha$ | $\alpha_1$ | $\alpha_2$ | $\alpha_3$ |

US 7,886,314 B2

DISK DEVICE, SHUTTER CONTROL DEVICE, AND COMPUTER PROGRAM FOR SHUTTER OPENING/CLOSING CONTROL

TECHNICAL FIELD

The present invention relates to a disk device in which various equipments are housed in a container body.

BACKGROUND ART

A disk device is used for replaying data from an optical disk and the like, or for recording/replaying data to/from an optical disk and the like. In recent years, such disk devices are being widely used because of the diffusion of computers and/or devices can record and replay audio and video. For example, Patent Document 1 discloses a disk device including a shutter on a disk insertion slot.

Patent Document 1: Japanese Patent Application Laid-Open No. 2001-101744

DISCLOSURE OF INVENTION

Problem to be Solved by the Invention

When a disk is pinched by a shutter due to an erroneous operation and the like by a user, the disk may be scratched or excess load may be put on a mechanism for opening/closing the shutter. Therefore, when the disk is pinched by the shutter, it is necessary to assuredly detect pinching of the disk, and suspend subsequent closing operation of the shutter. A technology for doing this is not disclosed in the disk device disclosed in the Patent Document 1. Thus, there is a room for improvement in detecting whether a disk is pinched by a shutter.

The present invention has been achieved to solve the above exemplary problems in the conventional technology. Specifically, it is an object of the present invention to provide a disk device, a shutter control device, and a shutter opening/closing computer program capable of assuredly determining a state where a shutter pinches a disk in a disk device that has a shutter at a disk insertion slot.

Means for Solving Problem

The invention disclosed in claim 1 provides a disk device. The disk device includes a disk insertion slot from which a disk is inserted into a disk driving unit that rotates the disk; a shutter that opens and closes the disk insertion slot; and a shutter control unit that determines whether the disk is pinched by the shutter based on a position of the shutter during a process of closing the shutter, and changes sensitivity of determination depending on a shutter operation parameter that defines mobility of the shutter.

The invention disclosed in claim 6 provides a disk device. The disk device includes a disk insertion slot for inserting a disk to a disk driving unit that rotates the disk; a shutter that opens and closes the disk insertion slot; and a shutter control unit that determines whether the disk is pinched by the shutter based on a position of the shutter during a process of closing the shutter, and changes sensitivity of determination depending on number of times where it is determined that the disk is pinched by the shutter.

The invention disclosed in claim 8 provides a shutter control device that controls a shutter for opening and closing a disk insertion slot from which a disk is inserted into a disk driving unit that rotates the disk. The shutter control device includes a pinch determining unit that determines whether the disk is pinched by the shutter based on a position of the shutter during a process of closing the shutter; and a sensitivity changing unit that changes sensitivity of determination based on a shutter operation parameter that defines mobility of the shutter.

The invention disclosed in claim 11 provides a shutter control device that controls a shutter for opening and closing a disk insertion slot from which a disk is inserted into a disk driving unit that rotates the disk. The shutter control device includes a pinch determining unit that determines whether the disk is pinched by the shutter based on a position of the shutter during a process of closing the shutter; and a sensitivity changing unit that lowers sensitivity of determination when number of times where it is determined that the disk is pinched by the shutter exceeds a predetermine number.

The invention disclosed in claim 12 provides a computer program for opening and closing a shutter used in a disk device that includes a shutter for opening and closing a disk insertion slot from which a disk is inserted into a disk driving unit that rotates the disk. The computer program causes a computer to execute, when the shutter is closing, determining whether the disk is pinched by the shutter based on a position of the shutter during a process of closing the shutter; and changing sensitivity of determination based on a shutter operation parameter that defines mobility of the shutter.

The invention disclosed in claim 15 provides a computer program for opening and closing a shutter used in a disk device that includes a shutter for opening and closing a disk insertion slot from which a disk is inserted into a disk driving unit that rotates the disk. The computer program causes a computer to execute, when the shutter is closing, determining whether the disk is pinched by the shutter based on a position of the shutter during a process of closing the shutter; and lowering sensitivity of determination when the number of times where it is determined that the disk is pinched by the shutter exceeds a predetermine number.

BRIEF DESCRIPTION OF DRAWINGS

FIG. 5 is a schematic diagram of an example of a threshold determination map used for determining a threshold.

FIG. 9 is a schematic diagram of an example of a threshold determination map used for determining a threshold.

EXPLANATIONS OF LETTERS OR NUMERALS

Figure 1:
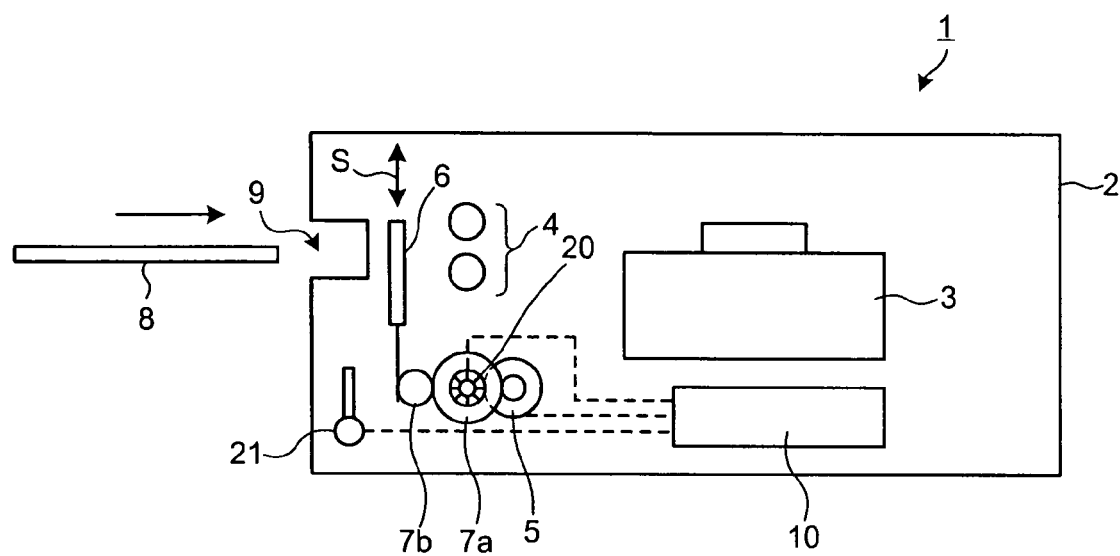
FIG. 1 is a schematic diagram of a disk device according to an embodiment of the present invention.

1 Disk device
2 Container body
3 Disk driving unit
4 Disk delivering device
5 Motor
5D Motor driver
6 Shutter
8 Disk
9 Disk insertion slot
10 Shutter control device
11 CPU
12 Storing unit
13 Counter
$13_1$ Calculation counter
$13_2$ Pinch determination counter
14 Pinch determining unit
15 Sensitivity changing unit
16 Calculating unit
20 Rotary encoder
21 Temperature sensor
30, 31 Threshold determination map

BEST MODE(S) FOR CARRYING OUT THE INVENTION

Exemplary embodiments of the present invention are explained in detail below with reference to the accompanying drawings. The present invention is not limited to the following embodiments. Constituent elements in the embodiments contain those that can easily be thought of by persons skilled in the art or those substantially equivalent thereto. Furthermore, the present invention can be applied to any disk devices regardless of disk types as long as the disk devices include a shutter, which automatically opens and closes at a disk insertion slot.

Embodiments

A disk device according to an embodiment of the present invention includes a shutter, which is arranged on a disk insertion slot to automatically open and close the disk insertion slot, and determines whether the disk is pinched by the shutter based on a position of the shutter during a process of closing the shutter. The disk device is characteristic in that the disk device changes sensitivity of determination depending on a shutter operation parameter that defines mobility of the shutter.

FIG. 1 is a schematic diagram of the disk device according to the embodiment. A disk device 1 includes a disk driving unit 3 inside a container body 2. The container body 2 includes a disk insertion slot 9. A disk 8 is inserted into the container body 2 from the disk insertion slot 9, so that the disk 8 is delivered to the disk driving unit 3 by a disk delivering device 4.

The disk insertion slot 9 is opened and closed by a movement of a shutter 6 in a direction represented by an arrow S. The shutter 6 has a function to prevent erroneous insertion of the disk 8. The shutter 6 is driven by a motor 5 as a shutter driving unit via conveyance gears 7a and 7b. The motor 5, the conveyance gears 7a, 7b, and the like constitute a shutter driving mechanism.

A position of the shutter is detected by a position detecting unit arranged on the conveyance gear 7a. A rotary encoder 20 is used in the embodiment as the position detecting unit. A temperature sensor 21 is arranged near the shutter driving mechanism in the container body 2. The temperature sensor 21 measures a temperature around the shutter driving mechanism. A shutter control device 10 arranged in the container body 2. The shutter control device 10 drives the motor 5 to open or close the shutter 6 based on data acquired from the rotary encoder 20 and the temperature sensor 21. The shutter control device 10 is explained below.

Figure 2:
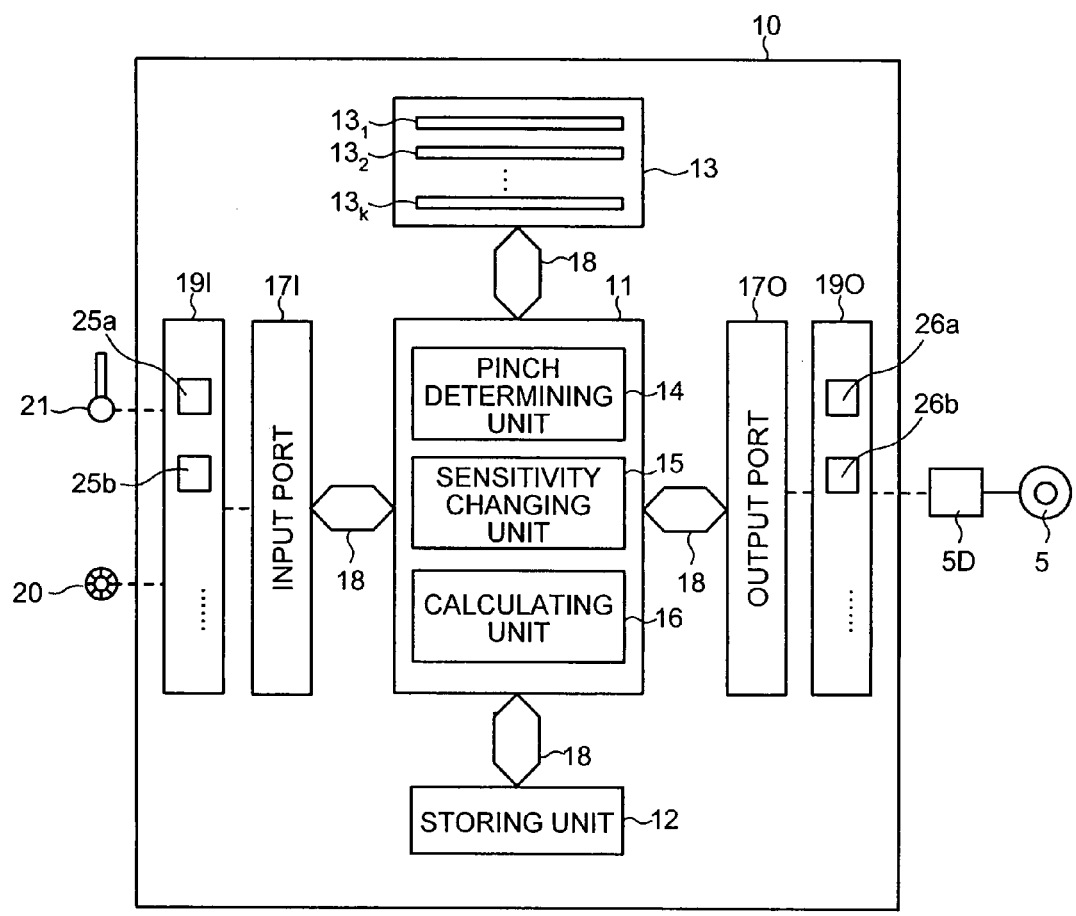
FIG. 2 is a schematic diagram for explaining an exemplary configuration of a shutter control device according to the embodiment.

FIG. 2 is a schematic diagram of an exemplary configuration of the shutter control device according to the embodiment. As shown in FIG. 2, the shutter control device 10 as a shutter control unit includes a central processing unit (CPU) 11, a storing unit 12, an input port 17I, an output port 17O, a counter 13, and a bus 18 that connects above units to one another.

The shutter control device 10 includes a pinch determining unit 14, a sensitivity changing unit 15, and a calculating unit 16. These units serve as a member for performing a control according to the embodiment. Each of the pinch determining unit 14, the sensitivity changing unit 15, and the calculating unit 16 is constituted as a part of the CPU 11 constituting the shutter control device 10 according to the embodiment.

The CPU 11, the storing unit 12, and the counter 13 are connected to one another via the bus 18. Each of the pinch determining unit 14, the sensitivity changing unit 15, and the calculating unit 16 constituting the shutter control device 10 can exchange control data with one another or send a command from one to the others.

An input interface (I/F) 19I is connected to the input port 17I. The rotary encoder 20, the temperature sensor 21, and various other sensors that acquire data necessary for controlling opening/closing of the shutter 6 are connected to the input I/F 19I. An analogue/digital (A/D) converter 25a or a digital buffer 25b in the input I/F 19I converts the signals output from those sensors into signals that can be used in the CPU 11, and send these signals to the input port 17I. Accordingly, the CPU 11 acquires data necessary for controlling opening/closing of the shutter 6 according to the embodiment.

An output I/F 19O is connected to the output port 17O. A motor driver 5D that drives the motor 5 is connected to the output I/F 19O. The output I/F 19O includes control circuits 26a and 26b, and drives a control target based on a control signal calculated by the CPU 11. With above configuration, the shutter control device 10 according to the embodiment executes a control of opening/closing of a shutter according to the embodiment based on a detection signal from the above sensors.

The storing unit 12 stores therein a computer program that implements processing procedures of a shutter opening/closing control according to the embodiment, a control map, and the like. The storing unit 12 can be a volatile memory, such as a random access memory (RAM), a nonvolatile memory, or a combination of the volatile memory and the nonvolatile memory.

It is allowable to write the computer program such that the computer program realizes the processing procedures of the shutter opening/closing control according to the embodiment in combination with another computer program that has been recorded in the CPU 11. It is allowable to configure the shutter control device 10 as a dedicated hardware so that the shutter control device 10 realizes functions of the pinch determining unit 14, the sensitivity changing unit 15, and the calculating unit 16 without the computer program. A procedure for controlling opening/closing of the shutter 6 according to the embodiment using the shutter control device 10 is described below. During this explanation, FIGS. 1 and 2 are referred to as appropriate.

Figure 3:
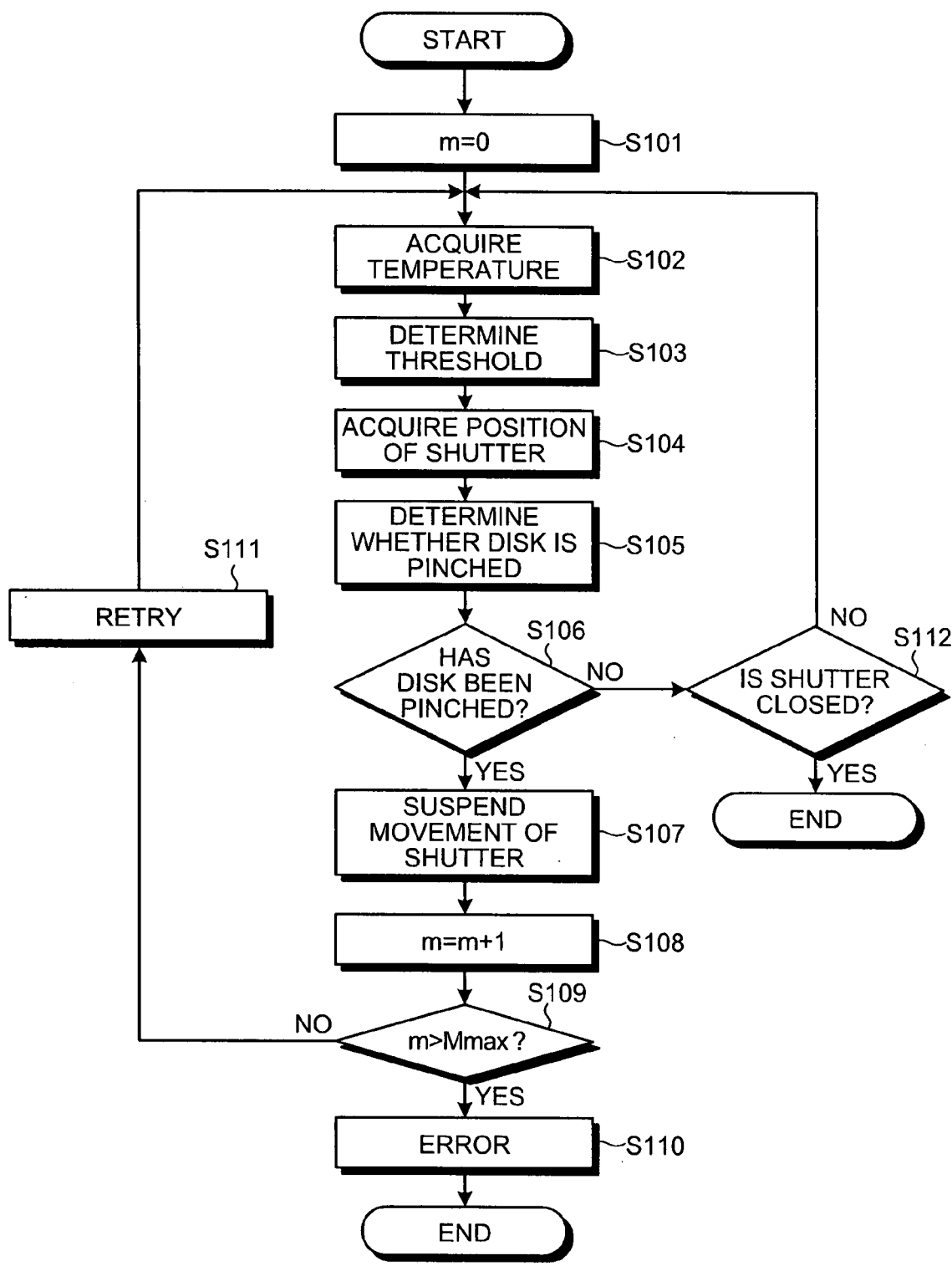
FIG. 3 is a flowchart of an exemplary processing procedure of controlling opening/closing of a shutter according to the embodiment.
Figure 4:
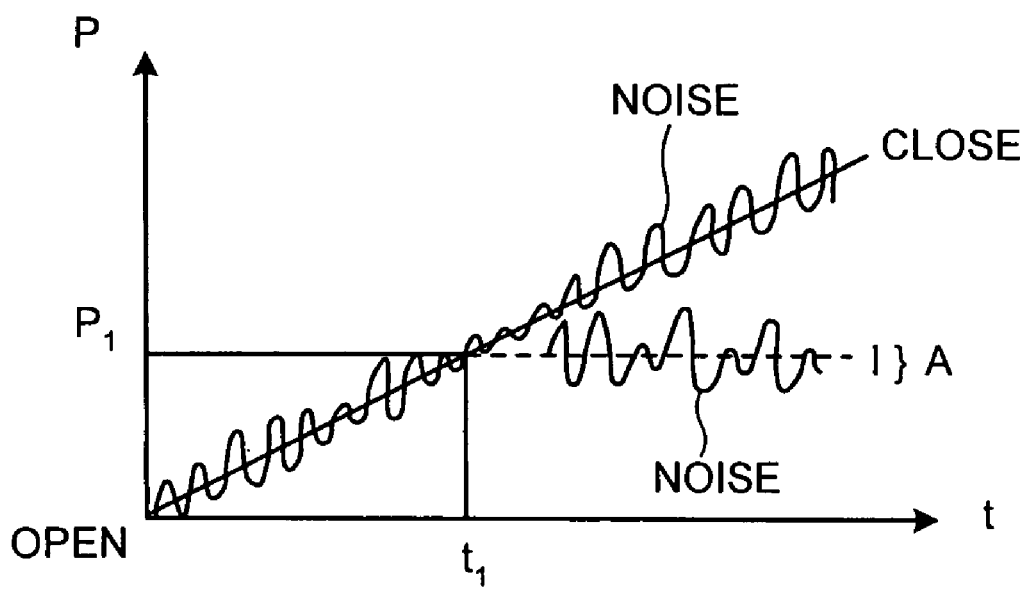
FIG. 4 is a schematic diagram for explaining time variation of output of a rotary encoder during a process of closing a shutter.

FIG. 3 is a flowchart of an exemplary processing procedure of controlling opening/closing of a shutter 6. FIG. 4 is a schematic diagram for explaining time variation of output of the rotary encoder 20 during a process of closing a shutter 6. FIG. 5 is a schematic diagram of an example of a threshold determination map used for determining a threshold. The pinch determining unit 14 included in the shutter control device 10 initiates a pinch-detection count m to zero (step S101). The pinch-detection count m is the number of times of detection, by the shutter control device 10, of a situation where the disk 8 is pinched by the shutter 6. The pinch-detection count m is stored in the storing unit 12 of the shutter control device 10.

As shown in FIG. 4, during a process of closing the shutter 6, the distance P for which the shutter moves, which is calculated from an output of the rotary encoder 20, increases constantly as time t elapses. On the contrary, when the shutter 6 pinches the disk 8 (at time $t_1$ shown in FIG. 4), the shutter 6 stops moving, so that the distance P stops increasing after a certain distance $P_1$ (doted lines shown in FIG. 4). Therefore, when an output of the rotary encoder 20 is within a predetermined range A even after a predetermined time has elapsed, it is possible to determine that the shutter 6 has pinched the disk 8. In other words, it is possible to determine whether the shutter 6 has pinched the disk 8 based on the position of the shutter 6 during the process of closing the shutter 6.

The calculating unit 16 acquires temperature (hereinafter, "ambient temperature") T around the shutter driving mechanism from the temperature sensor 21 (step S102), and determines a threshold $\alpha$ for determining whether the shutter 6 pinches the disk 8 (step S103). By changing the threshold, it is possible to change sensitivity of determining whether the shutter 6 pinches the disk 8. In an example shown in connection with FIG. 4, it is assumed that the predetermined range A is the threshold. The threshold $\alpha$ is determined from a threshold determination map 30 shown in FIG. 5 according to the embodiment. As shown in FIG. 5, the threshold $\alpha$ is determined from the ambient temperature T and the pinch-detection count m by using the threshold determination map 30.

If the sensitivity is set lower, it is difficult to detect pinching of the disk 8 by the shutter 6. On the contrary, if the sensitivity is set higher, it is easier to detect pinching of the disk 8 by the shutter 6. According to the embodiment, it is determined whether the shutter 6 has pinched the disk 8 based on variation of the position of the shutter 6. At a certain variation of the position of the shutter 6, it is determined that the shutter 6 does not pinch the disk 8 when the sensitivity is low, while it is determined that the shutter 6 pinches the disk 8 when the sensitivity is high.

The ambient temperature T is used as a shutter operation parameter that defines mobility of the shutter 6 according to the embodiment. This is because the mobility of the shutter 6 is affected by the ambient temperature T of the driving mechanism of the shutter 6. It is possible to use, in addition to the ambient temperature T, humidity around the driving mechanism of the shutter 6 or motor driving current for driving the motor 5 as the shutter operation parameter.

In the threshold determination map 30 shown in FIG. 5, it is assumed that the ambient temperature satisfies $T_1<T_2<T_3$. Moreover, it is assumed that $\alpha_{11}<\alpha_{12}<\alpha_{13}$ and $\alpha_{21}<\alpha_{22}<\alpha_{23}$. In other words, as the ambient temperature T decreases, the threshold $\alpha$ is changed (in this embodiment, threshold $\alpha$ decreases). With above assumption, as the ambient temperature T decreases, the sensitivity of determining whether the shutter 6 pinches the disk 8 is changed (in this embodiment, the sensitivity is lowered) because of the following reason.

Movement of the shutter driving mechanism is affected by the ambient temperature. When the ambient temperature is low, viscosity of lubricant spread on the conveyance gears 7a and 7b included in the shutter driving mechanism increases, so that mobility of the shutter driving mechanism lowers. Therefore, if the threshold $\alpha$ is large, i.e., the sensitivity is high, it may be erroneously determined that the disk is pinched because the mobility of the shutter driving mechanism is low. Thus, by adjusting the threshold $\alpha$ (i.e., sensitivity) depending on the ambient temperature, precision of determining whether the shutter 6 pinches the disk 8 can be improved.

Furthermore, the threshold $\alpha$ is set smaller than a certain value when the pinch-detection count m is larger than a certain number M, while the threshold $\alpha$ is set higher than the certain value when the pinch-detection count m is equal to or smaller than the number M. In other words, when the pinch-detection count m exceeds a predetermined value, the sensitivity of determining whether the shutter 6 pinches the disk 8 is lowered because of the following reason.

When the mobility of the shutter driving mechanism is low for some reason, if the threshold $\alpha$ is large, i.e., the sensitivity is high, it may be erroneously determined that the disk is pinched because the mobility of the shutter driving mechanism is low. As a result, although the disk 8 is not pinched by the shutter 6, an operation of closing the shutter 6 needs to be repeated (retried), so that time is unnecessarily spent until the operation of closing the shutter 6 is completed.

To solve such a problem, in the embodiment, the threshold $\alpha$ is set smaller when the number of times of determining that the disk 8 is pinched by the shutter 6, i.e., the pinch-detection count m, exceeds the number M, i.e., the sensitivity of determining whether the disk 8 is pinched by the shutter 6 is set lower, and an operation of closing the shutter 6 is repeated. Accordingly, it is possible to avoid erroneous determination arising from lowered mobility of the shutter driving mechanism, to assuredly close the shutter 6. In general, a user does not repeatedly perform erroneous operations for a large number of times, so that it is possible to improve precision of determining whether the shutter 6 pinches the disk 8 by changing the threshold $\alpha$ (i.e., the sensitivity) depending on the pinch-detection count m.

The threshold determination map 30 is stored in the storing unit 12 of the shutter control device 10. The sensitivity changing unit 15 sends the ambient temperature T detected by the temperature sensor 21 and the pinch-detection count m to the threshold determination map 30. The threshold determination map 30 returns the threshold $\alpha$ corresponding to the ambient temperature T and the pinch-detection count m to the sensitivity changing unit 15. The threshold $\alpha$ is determined in this manner (step S103). The pinch determining unit 14 acquires a position of the shutter 6 detected by the rotary encoder 20 (step S104), and determines whether the shutter 6 pinches the disk 8 based on the determined threshold $\alpha$ and the position of the shutter 6 (step S105). This determination process is described below.

In the embodiment, as described in connection with FIG. 4, it is possible to determine whether the disk 8 is pinched based on whether variation of output of the rotary encoder 20 for a predetermined time period, i.e., variation of the position of the shutter 6 for a predetermined time period, is within a predetermined range A. However, as shown in FIG. 4, the output of the rotary encoder 20 as a position detecting unit contains noise. Therefore, when the range A is widened, i.e., the sensitivity is made higher, it may be erroneously determined, due to the noise, that the disk 8 is pinched by the shutter 6 although the disk 8 is not actually pinched. If such an erroneous determination is made, the shutter 6 is re-closed and process control proceeds to a retry operation, so that time is unnecessarily spent until the shutter 6 is completely closed.

On the other hand, when the range A is narrowed, i.e., the sensitivity is made lower, it is may be erroneously determined that the disk 8 is not pinched by the shutter 6 although the disk 8 is actually pinched. If such an erroneous determination is made, the disk 8 may be scratched or excess load may be put on the shutter driving mechanism. To solve such a problem, in the embodiment, disk pinch is assuredly determined by using a disk-pinch determination method described below.

Figure 6:
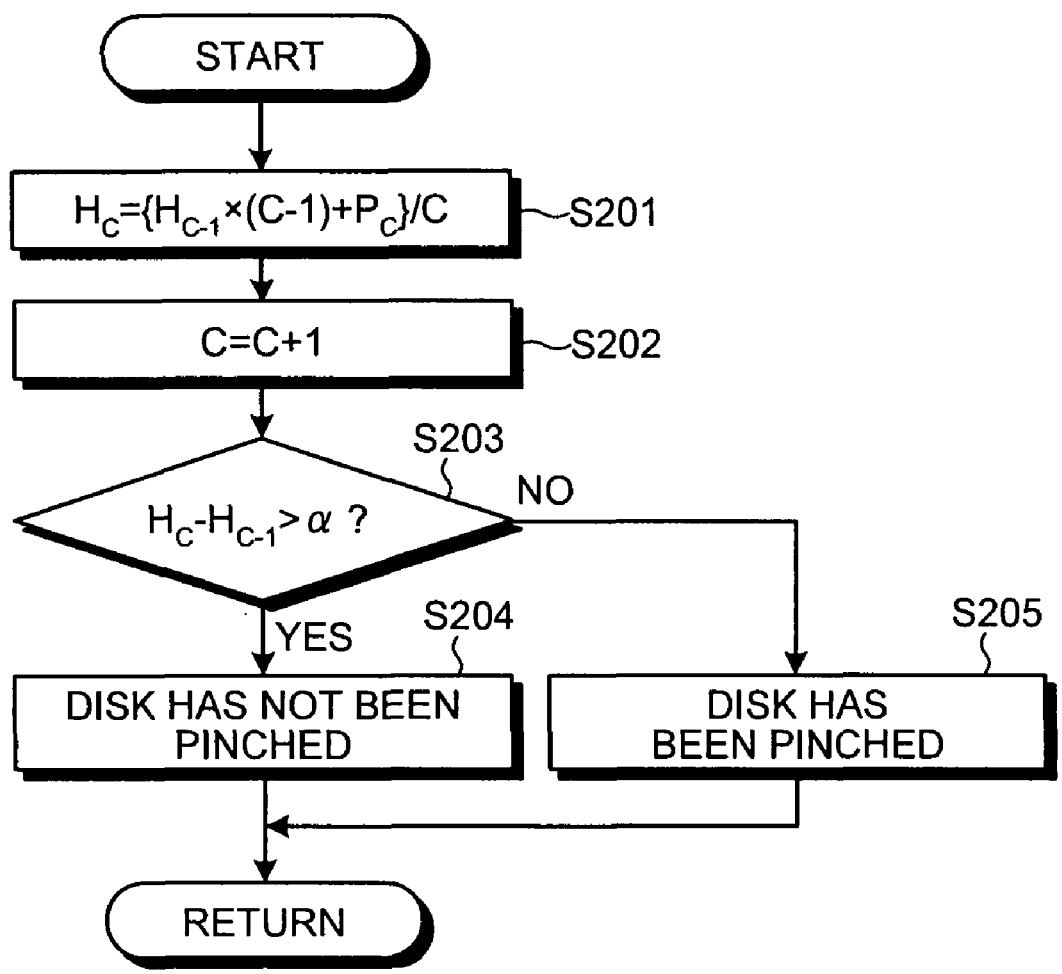
FIG. 6 is a flowchart of a disk-pinch determination method according to the embodiment.

FIG. 6 is a flowchart of the disk-pinch determination method according to the embodiment. The disk-pinch determination method is for determining whether the disk 8 is pinched based on variation using an average amount of movement of the shutter 6. Accordingly, an undesirable effect caused by noise can be reduced to assuredly detect whether the disk 8 is pinched. It is allowable to use a moving average and the like as the average amount of movement of the shutter 6. However, in the embodiment, the average distance of the shutter 6 (hereinafter, "shutter position indicator") represented by Equation (1) is used.

$$H_C = \{H_{C-1} \times (C-1) + P_C\}/C \quad (1)$$

In above Equation, H represents a shutter position indicator, and P represents a position of the shutter 6 (shutter position) obtained from an output of the rotary encoder 20. C represents a calculation count number, which is the number of times of calculation of the shutter position indicator H (shutter position indicator calculation number). The calculation count number C is normally the number of times of acquiring an output of the rotary encoder 20, which is sampling number of times of the output of the rotary encoder 20. Subscript C on H and P represents C-th shutter position indicator H and the shutter moving distance P.

As can be understood from Equation (1), the shutter position indicator (a first shutter position indicator) $H_C$ according to the embodiment is obtained by dividing a value, which is obtained by adding a value from a multiply between a previous shutter position indicator (a second shutter position indicator) $H_{C-1}$ and a previous count number (C−1) to a current shutter moving distance $P_C$, by a current calculation count number C. The previous shutter position indicator $H_{C-1}$ is stored in the storing unit 12 of the shutter control device 10. The calculation count number C is a value of a calculation counter $13_1$ (see FIG. 2) of the counter 13.

When a moving average is used as an average distance of the shutter 6, it is necessary to store a certain number of shutter distances used for calculating the moving average in the storing unit 12. Therefore, it is difficult to effectively use the storing unit 12 when capacity of the storing unit 12 is limited. On the contrary, according to the disk-pinch determination method according to the embodiment, because the shutter position indicator H defined by Equation (1) is used, the previous shutter position indicator $H_{C-1}$ is only required to be stored in the storing unit 12 for calculating the shutter position indicator H. Therefore, data volume that needs to be stored in the storing unit 12 can be reduced compared to a case for using the moving average.

For example, when ten pieces of the shutter distances P are necessary for calculating the moving average, the previous shutter position indicator $H_{C-1}$ is only necessary for calculating the shutter position indicator H according to the embodiment. Therefore, in the disk-pinch determination method according to the embodiment, it is possible to reduce usage of the storing unit 12 to effectively use the storing unit 12. Specifically, it is preferable when capacity of the storing unit 12 is limited from a point of costs.

For executing the disk-pinch determination method according to the embodiment, the pinch determining unit 14 sends the output acquired from the rotary encoder 20 to the sensitivity changing unit 15 included in the shutter control device 10. The sensitivity changing unit 15 converts the acquired output of the rotary encoder 20 into the shutter distance, and calculates the shutter position indicator $H_C$ corresponding to the calculation count number C based on the Equation (1) (step S201). The calculation count number C is set to 1, i.e., C=1, when the pinch detection number M is reset to zero (step S101 shown in FIG. 3). In other words, the initial value of the calculation counter 13, (see FIG. 2) is set to 1.

For example, when the calculation counter number C=1, it is determined that $H_1 = \{H_0 \times (1-1) + P_1\}/1 = P_1$. On the other hand, when the calculation counter number C=10, it is determined that $H_{10} = \{H_{10} \times (10-1) + P_{10}\}/10 = (9 \times H_{10} + P_{10})/10$. Once the sensitivity changing unit 15 has calculated the shutter position indicator $H_C$ (step S201), the sensitivity changing unit 15 increments by one a count value of the calculation counter $13_1$. In other words, a value with one added to the calculation count number C is set to a new calculation count number C (step S202). The calculation count number C can be stored in the storing unit 12.

The sensitivity changing unit 15 calculates the difference ΔH between the current shutter position indicator $H_C$ and the previous shutter position indicator $H_{C-1}$, and returns the difference ΔH to the pinch determining unit 14. The sensitivity changing unit 15 overwrites the current shutter position indicator $H_C$ on the previous shutter position indicator $H_{C-1}$ in the storing unit 12. The pinch determining unit 14 compares the difference $\Delta H = H_C - H_{C-1}$ received from the sensitivity changing unit 15 with the threshold α determined at step S103 (see FIG. 3) (step S203).

If $H_C - H_{C-1} > \alpha$ (Yes at step S203), it is determined that the disk 8 is not pinched by the shutter 6 (step S204). On the other hand, if $H_C - H_{C-1} \leq \alpha$ (No at step S203), it is determined that the disk 8 is pinched by the shutter 6 (step S205). This determination process is described below.

Figure 7:
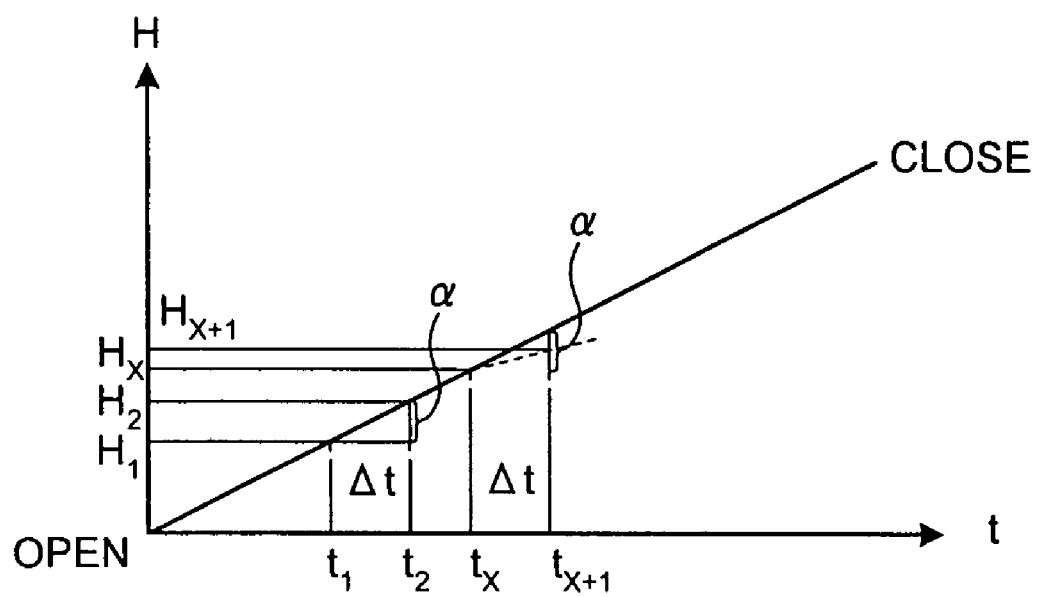
FIG. 7 is a schematic diagram for explaining time variation of a shutter position indicator during a process of closing the shutter.

FIG. 7 is a schematic diagram for explaining time variation of the shutter 6 position indicator during a process of closing the shutter. A subscript on the shutter position indicator H and time t represents the calculation count number C. When the shutter 6 is closing, the output of the rotary encoder 20 increases steadily, i.e., the distance P increases steadily as time t elapses. Therefore, as understood from Equation (1), when the shutter 6 is closing, the shutter position indicator H increases as the time t elapses (FIG. 7).

Because moving speed of the shutter 6 is substantially constant, the distance P per unit time Δt is substantially constant. During a process of closing the shutter 6, the shutter position indicator H increases in proportion to the time t (FIG. 7). Therefore, when variation in the shutter position indicator H per unit time Δt is larger than the predetermined threshold α, it is possible to determine that the shutter 6 is normally driven without pinching the disk 8.

Assume now that the disk 8 is pinched by the shutter 6 at a time $t_X$. The shutter position indicator $H_{X+1}$ at a time $t_{X+1}$ is determined by Equation (1), i.e., $\{H_{X+1} \times (X+1-1) + P_{X+1}\}/(X+1) = (X \times H_{X+1} + P_{X+1})/(X+1)$. Because the shutter moving distance $P_{X+1}$ is substantially zero at time $t_{X+1}$, $H_{X+1} - H_X < \alpha$. Thus, whether the disk 8 is pinched by the shutter 6 can be determined from the shutter position indicator H and the threshold $\alpha$.

Referring back to FIG. 3, the explanation is continued. If the determination by the pinch determining unit 14 (step S105) shows that the disk 8 is not pinched (No at step S106), the pinch determining unit 14 determines whether the shutter 6 is completely closed (step S112). When the shutter 6 is completely closed, the shutter driving control is terminated (Yes at step S112). When the shutter 6 is not completely closed (No at step S112), the processes at the steps S102 to S106 are repeated.

When the disk 8 is pinched (Yes at step S106), the pinch determining unit 14 suspends the shutter 6 (step S107), and increments the pinch-detection count m by one (step S108). The pinch-detection count m is incremented each time the disk 8 is pinched by the shutter 6. Subsequently, the pinch determining unit 14 compares the pinch-detection count m with a predetermined number $M_{max}$ (step S109).

If the pinch-detection count m is equal to or smaller than the number $M_{max}$ (No at step S109), the pinch determining unit 14 sets back the shutter 6 to an initial position (i.e., the fully opened position), and re-closes the shutter 6 (retry at step S111). Subsequently, the system control is returned to the step S102. If the pinch-detection count m is larger than the number $M_{max}$ (Yes at step S109), the pinch determining unit 14 determines that some error has occurred in the shutter driving mechanism and issues an error signal (step S110), and terminates the shutter driving control.

MODIFICATION EXAMPLE

A modification example of the shutter driving control according to the embodiment is described below. The shutter driving control according to the modification example is substantially the same as the shutter driving control according to the above embodiment. However, a process for changing the threshold depending on the number of pinches is different. The control of opening/closing the shutter according to the modification example can be realized by the shutter control device 10 described in the above embodiment.

Figure 8:
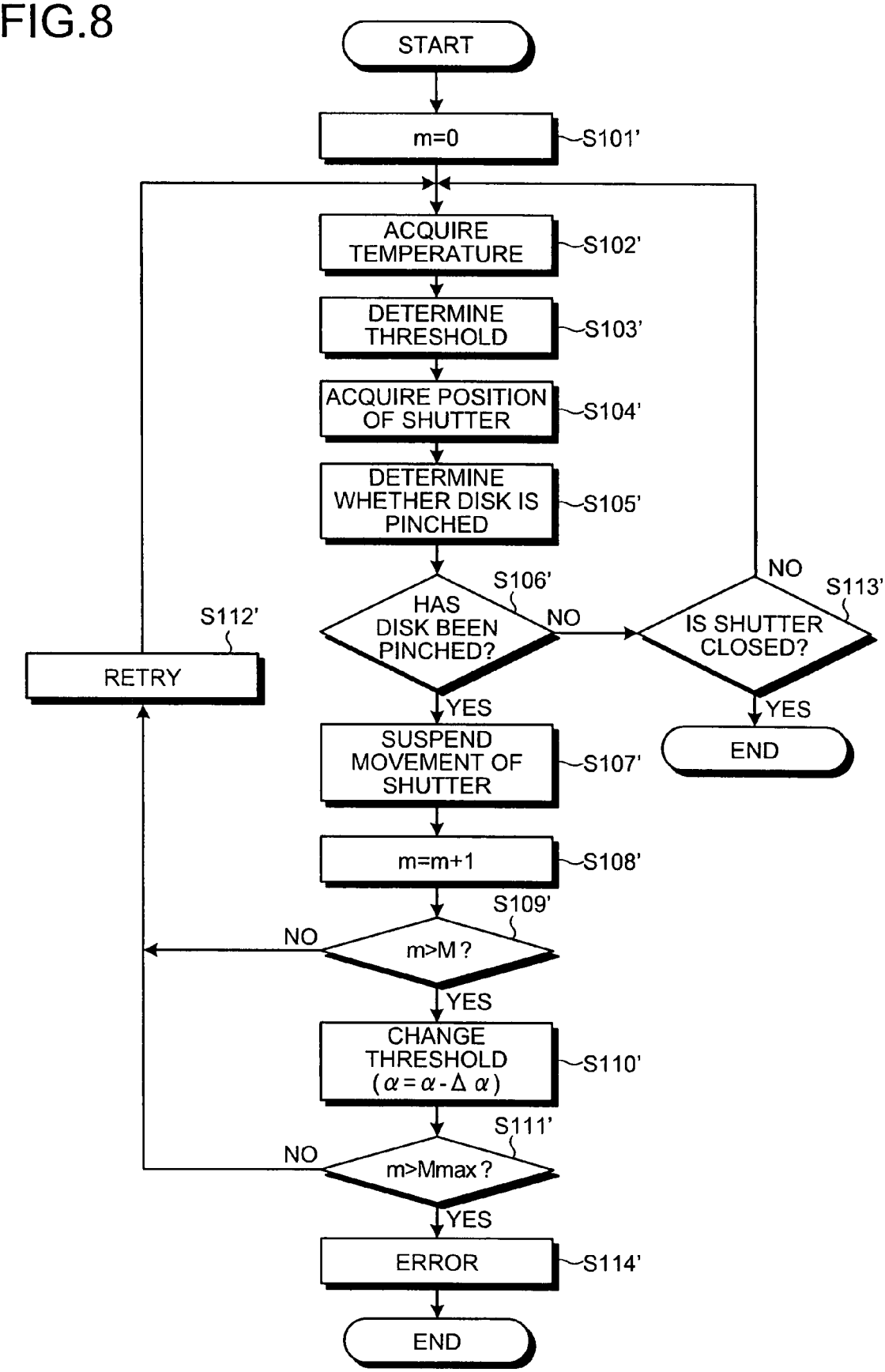
FIG. 8 is a flowchart of an exemplary processing procedure of controlling opening/closing of a shutter according to a modification of the embodiment.
Figure 9:
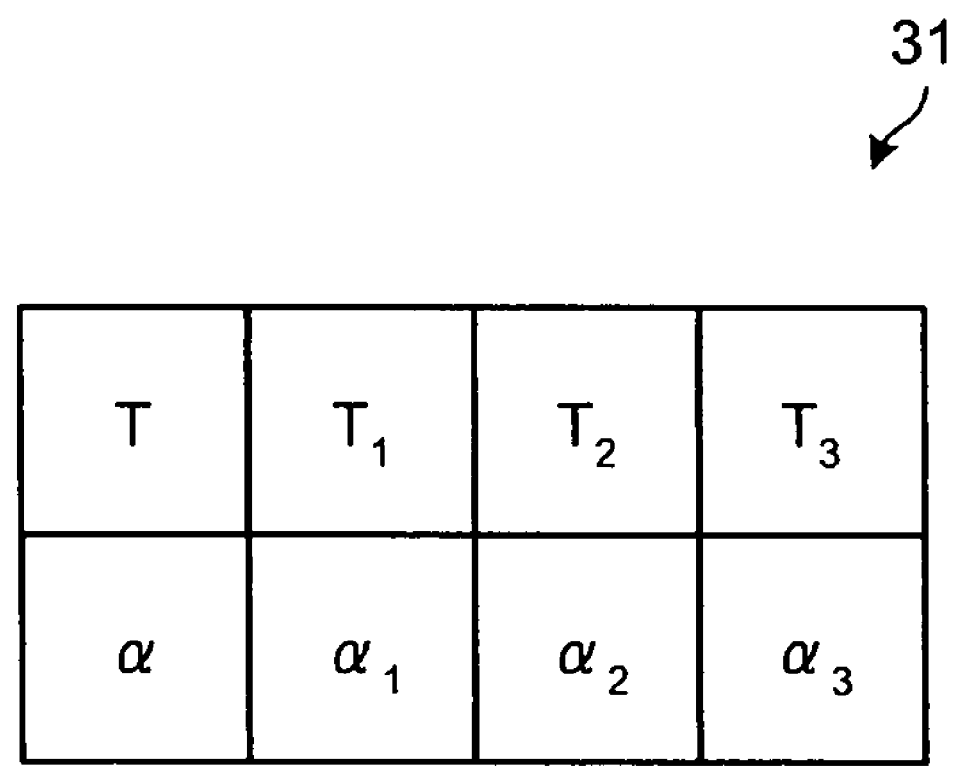

FIG. 8 is a flowchart of a processing procedure of controlling opening/closing of a shutter according to a modification example of the embodiment. FIG. 9 is a schematic diagram of an example of a threshold determination map used for determining a threshold. Steps S101' and S102' for controlling opening/closing of a shutter are the same as those of steps S101 and S102 according to the above embodiment. When the calculating unit 16 determines the threshold $\alpha$ for determining whether the shutter 6 pinches the disk 8 (step S103'), a threshold determination map 31 shown in FIG. 9 is used according to the modification example.

As shown in FIG. 9, the threshold determination map 31 is created so that the threshold $\alpha$ can be determined from the ambient temperature T. In the threshold determination map 31 shown in FIG. 9, it is assumed that $T_1 < T_2 < T_3$ and $\alpha_1 < \alpha_2 < \alpha_3$. In other words, as the ambient temperature T decreases, the threshold $\alpha$ is lowered. In other words, as the ambient temperature T decreases, the sensitivity of determining whether the shutter 6 pinches the disk 8 is lowered because of the reason described in the above embodiment.

Steps S104' to S108', which are performed after the threshold $\alpha$ is determined (step S103'), are the same as the steps S104 to S108 in the above embodiment. The pinch determining unit 14 increments the pinch-detection count m by one (step S108'), and compares the predetermined pinched number M with the pinch-detection count m (step S109').

If the pinch-detection count m is equal to or smaller than the number M (No at step S109'), the pinch determining unit 14 sets back the shutter 6 to the initial position (i.e., the fully opened position), and repeats processes from the step S102'. When the pinch-detection count m is larger than the number M (Yes at step S109'), the sensitivity changing unit 15 changes the threshold $\alpha$ (step S110'). In this example, a value obtained by subtracting a predetermine threshold variation $\Delta\alpha$ from the current threshold $\alpha$ ($\alpha - \Delta\alpha$) is determined as a new threshold (step S110'). Accordingly, the sensitivity of determining whether the disk 8 is pinched by the shutter 6 is lowered, so that it is possible to avoid an erroneous determination when the mobility of the shutter driving mechanism is degraded, resulting in assuredly closing the shutter 6.

Subsequently, the pinch determining unit 14 compares the pinch-detection count m with the number $M_{max}$ (step S111'). If the pinch-detection count m is equal to or smaller than the number $M_{max}$ (No at step S111'), the pinch determining unit 14 performs a retry (step S112') to repeat processes from the step S102'. When the pinch-detection count m is larger than the number $M_{max}$ (Yes at step S11'), the pinch determining unit 14 determines that some error has occurred in the shutter driving mechanism and issues an error signal (step S114'), and terminates the shutter driving control.

First Modification Example of the Disk-Pinch Determination Method

A first modification example of the disk-pinch determination method is described below. The disk-pinch determination method according to the modification example is substantially the same as the disk-pinch determination method according to the above embodiment. However, it is different in that occurrence of pinch is determined after the shutter position indicator becomes stable without determining the occurrence of pinch for a predetermined time from a start of closing the shutter. Other configurations are the same as those of the above embodiment. The disk-pinch determination method according to the modification example can be realized by the shutter control device 10 described in the above embodiment.

Figure 10:
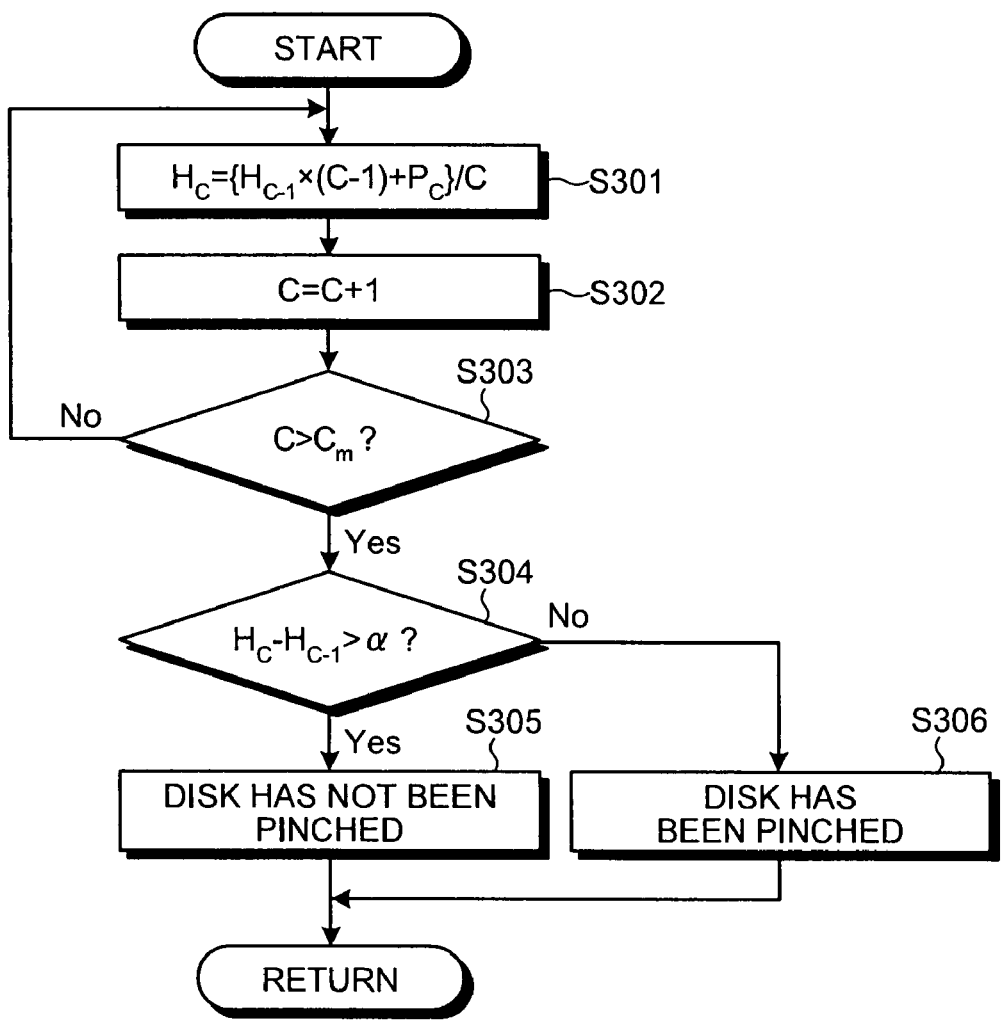
FIG. 10 is a flowchart of a disk pinch determination process according to a modification example of the embodiment.
Figure 11:
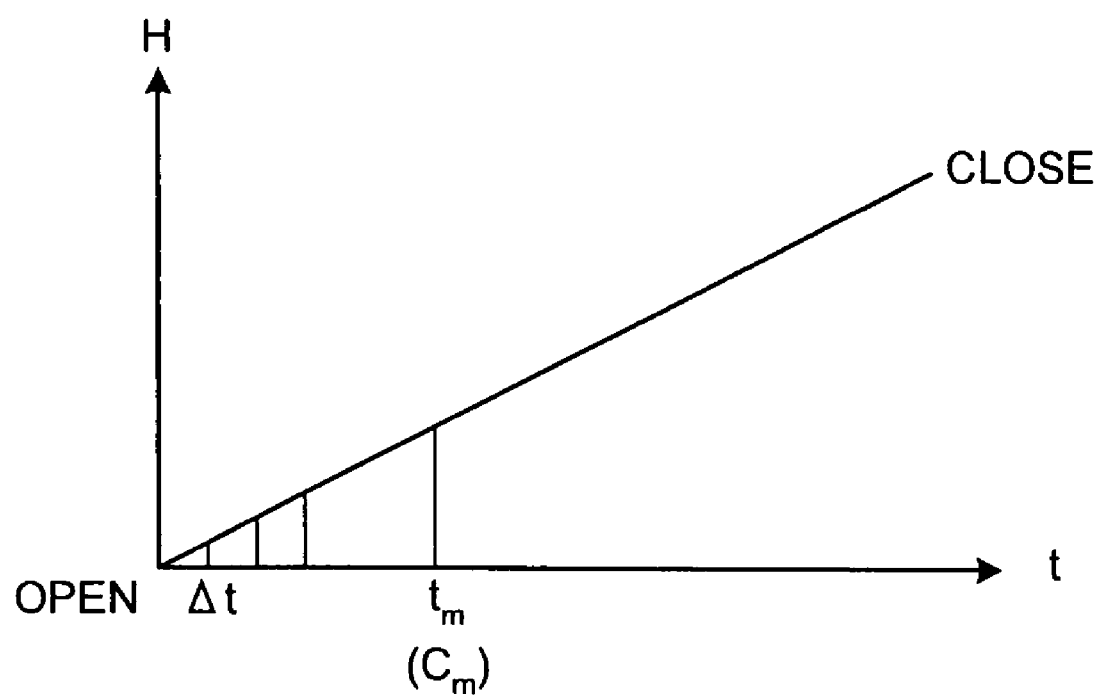
FIG. 11 is a schematic diagram for explaining time variation of a shutter position indicator during a process of closing the shutter.

FIG. 10 is a flowchart of the disk pinch determination process according to the modification example. FIG. 11 is a schematic diagram for explaining a time variation of a shutter position indicator during a process of closing the shutter 6. Steps S301 and S302 in the disk pinch determination process according to the modification example are the same as the steps S201 and S202 in the disk pinch determination process according to the above embodiment.

At step S303, the calculating unit 16 compares the current calculation count number C with a predetermined number $C_m$. When the current calculation count number C is equal to or smaller than the number $C_m$ (No at step S303 shown in FIG. 11), the processes at the steps S301 and S302 are repeated. Accordingly, data is accumulated during a period from a start of closing the shutter to a time when the shutter position indicator H becomes stable.

When the current calculation count number C is larger than the number $C_m$ (Yes at step S303 shown in FIG. 11), the sensitivity changing unit 15 calculates difference $\Delta H$ between the calculated current shutter position indicator $H_C$ and the previous shutter position indicator $H_{C-1}$, and returns the difference ΔH to the pinch determining unit 14. The sensitivity changing unit 15 overwrites the current shutter position indicator $H_C$ on the previous shutter position indicator $H_{C-1}$ in the storing unit 12.

Steps S304 to S306 are the same as the steps S203 to S205 described in the above embodiment. With a configuration described in the modification example, occurrence of pinch is determined after data is accumulated until the shutter position indicator H becomes stable, so that it is possible to improve precision of determining whether the shutter 6 pinches the disk 8.

Second Modification Example of the Disk-Pinch Determination Method

A second modification example of the disk-pinch determination method is described below. The disk-pinch determination method according to the modification example is substantially the same as the disk-pinch determination method according to the embodiment. However, a process for determining whether the disk is pinched by the shutter every time the shutter position indicator is calculated for a predetermined times without determining whether the disk is pinched every time the shutter position indicator is calculated. Other configurations are the same as those of the above embodiment. The disk-pinch determination method according to the modification example can be realized by the shutter control device 10 described in the above embodiment.

Figure 12:
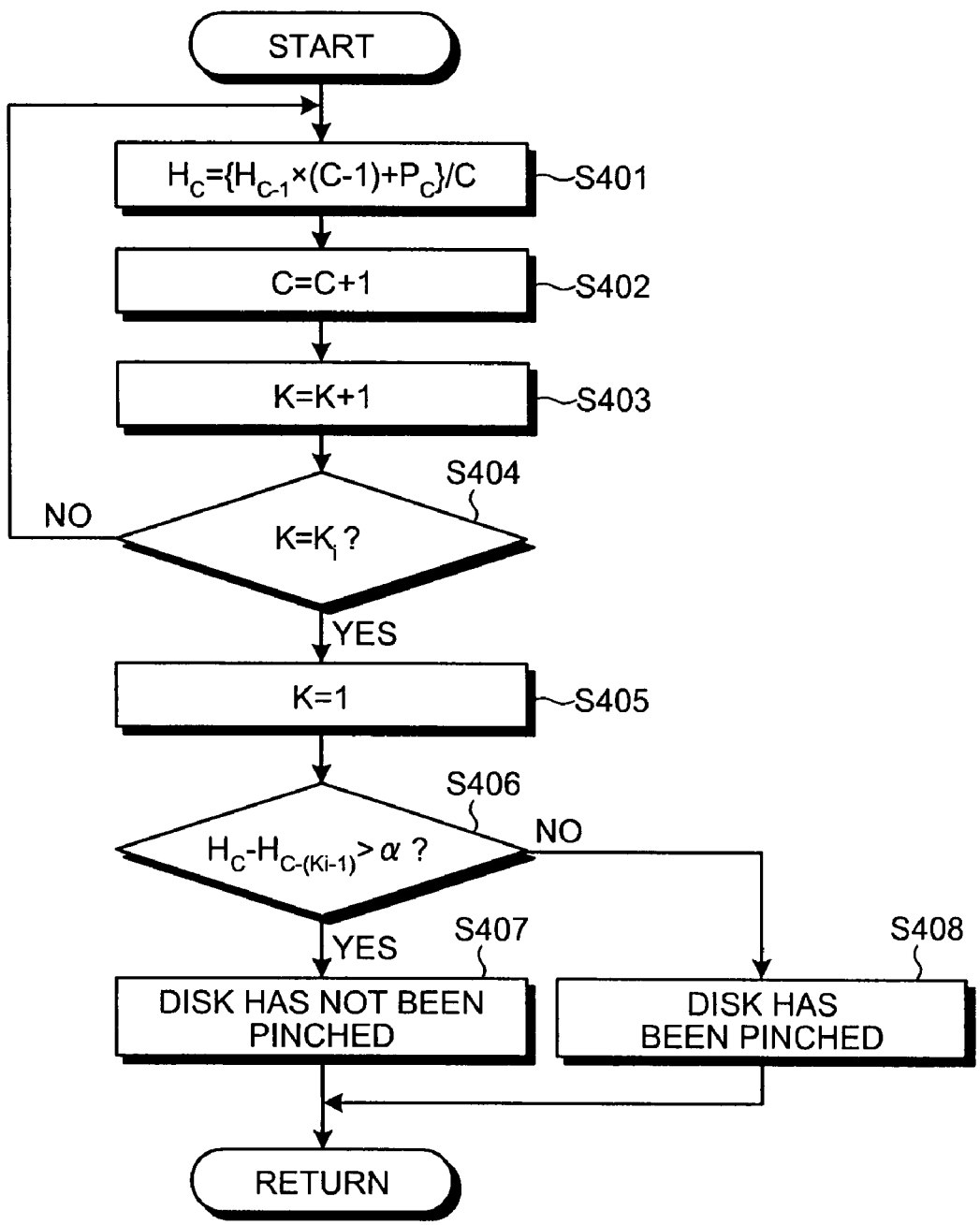
FIG. 12 is a flowchart of a disk pinch determination process according to a modification example of the embodiment.
Figure 13:
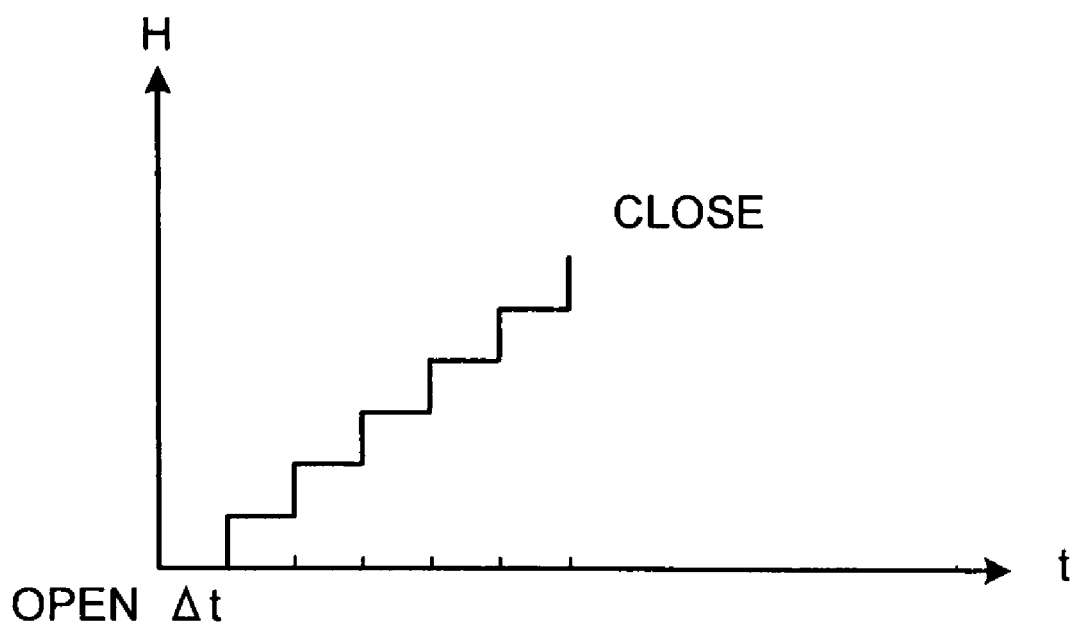
FIG. 13 is a schematic diagram for explaining time variation of a shutter position indicator during a process of closing the shutter.
Figure 14:
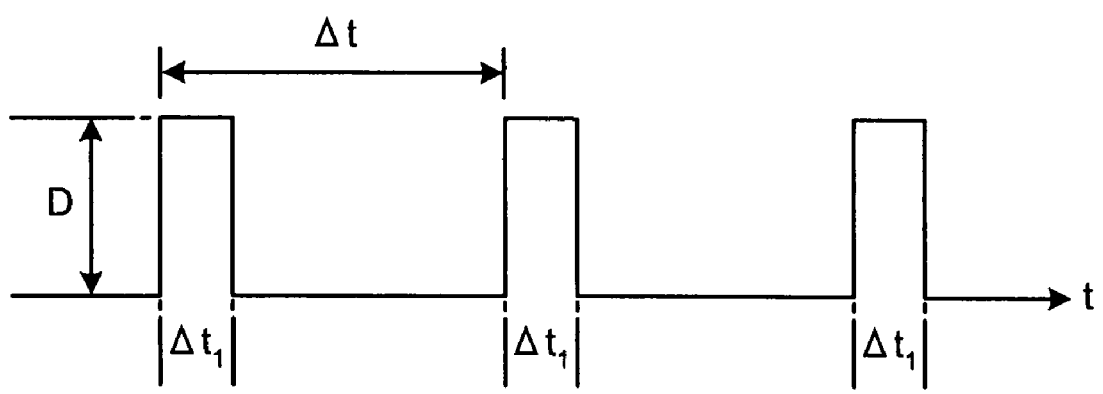
FIG. 14 is a timing chart of timing of driving a shutter.

FIG. 12 is a flowchart of the disk pinch determination process according to the modification example of the embodiment. FIG. 13 is a schematic diagram for explaining a time variation of the shutter position indicator during a process of closing the shutter 6. FIG. 14 is a timing chart indicative of timing of driving the shutter 6. Steps S401 and S402 in the disk-pinch determination method according to the modification example are the same as the steps S201 and S202 in the disk-pinch determination method according to the embodiment.

At step S403, the calculating unit 16 determines a value obtained by adding one to a current pinch determination count number K as a new pinch determination count number K. A pinch determination counter $13_2$ included in the counter 13 of the shutter control device 10 is used for counting the pinch determination count number K. The pinch determination count number K is reset to K=1 when the pinch-detection count m is reset to zero (step S101 shown in FIG. 3). In other words, an initial value of the pinch determination counter $13_2$ (see FIG. 2) is set to 1.

The calculating unit 16 compares the new pinch determination count number K with a standby count number $K_i$ (step S404). If K<$K_i$, the calculating unit 16 counts the calculation count number C and the pinch determination count number K until K=$K_i$. The count value of the pinch determination count number K can be stored in the storing unit 12. If K=$K_i$, (Yes at step S404), the calculating unit 16 resets the determination count number K to one (step S405).

Subsequently, the calculating unit 16 calculates the difference ΔH between the calculated current shutter position indicator $H_C$ and latest shutter position indicator $H_{C-(Ki-1)}$ used for previous pinch determination, and returns the difference ΔH to the pinch determining unit 14. The sensitivity changing unit 15 overwrites the current shutter position indicator $H_C$ on the shutter position indicator $H_{C-(Ki-1)}$ used for previous pinch determination in the storing unit 12. Steps S406 to S408 are the same as the steps S203 to S205 in the above embodiment. In this modification example, it is necessary to store in the storing unit, the shutter position indicator $H_{C-(Ki-1)}$ that was used for previous pinch determination, which is used for current pinch determination, in addition to the previous shutter position indicator $H_{C-1}$ used for calculating the current shutter position indicator $H_C$. However, usage of the storing unit 12 can be smaller compared to a case using moving average.

Because distance of the shutter per unit time is short, when variation in the shutter position indicator H per unit time is small, it is possible to erroneously determine that the disk 8 is pinched although the disk 8 is not actually pinched by the shutter 6 unless the threshold α is set smaller and the sensitivity of determination is set lower. Although, when the threshold α is set smaller, it is more likely to be undesirably affected by noise and to fail to perform pinch determination, if configured like this modification example, it is not necessary to perform pinch determination every time the shutter position indicator is calculated. Therefore, even when the threshold α is set larger to some extent, and the sensitivity of determination is set higher to some extent, it is possible to determine whether the disk is pinched. Thus, it is possible to improve precision of determining whether the disk is pinched, resulting in assuredly determining occurrence of pinch.

As shown in FIG. 13, the shutter 6 often moves intermittently by repeating movement and suspension. In this case, the shutter position indicator H varies in a staircase pattern in response to movement of the shutter 6 (FIG. 13). In the example described in connection with FIG. 13, a drive signal D of the motor 5 is sent during time $Δt_1$ for every unit of time Δt as shown in FIG. 14, indicating that the motor 5 rotates to cause the shutter 6 to move exclusively when the signal is generated. Thus, in the example described in connection with FIG. 13, the shutter 6 closes with a predetermined distance per unit time Δt As described above, when the shutter 6 moves intermittently, the shutter 6 dose not move during a time ($Δt-Δt_1$) when the drive signal D is not sent to the motor 5 in unit of time Δt. When the shutter 6 does not move, the shutter position indicator H becomes smaller than the threshold α, so that it is possible to erroneously determine that the disk 8 is pinched although the disk 8 is not actually pinched by the shutter 6.

In this modification example, when the shutter 6 moves (e.g., when the drive signal D is sent to the motor 5), determination of occurrence of pinch is performed, and when the shutter 6 does not move, the determination of occurrence of pinch is suspended. With above configuration, the determination of occurrence of pinch is performed when the shutter position indicator H varies, so that it is possible to improve precision of determination of occurrence of pinch, assuredly performing pinch determination.

It is possible to determine whether the disk is pinched every time the shutter position indicator is calculated when the shutter 6 moves intermittently. In this case, it is preferable to determine that the disk is pinched when a situation, in which the difference ΔH between the calculated current shutter position indicator $H_C$ and the previous shutter position indicator $H_{C-1}$ becomes smaller than the threshold α, is repeated for a predetermined number of times. The predetermined number of times in repetition is, e.g., the number of times of calculation of the shutter position indicator during a period in which the shutter 6 intermittently moves twice. With above configuration, it is possible to improve precision of determination of occurrence of disk pinch even when the determination of occurrence of disk pinch is performed every time the shutter position indicator is calculated.

As described above, according to the embodiment and the modification examples, it is determined whether the disk is pinched by the shutter based on a previous position of the shutter during a process of closing the shutter, and the sensitivity of determination is changed depending on shutter operation parameter that defines mobility of the shutter. Thus, it is possible to assuredly determine whether the shutter pinches the disk even when mobility of the shutter is changed.

Furthermore, according to the embodiment and the modification examples, it is determined whether the disk is pinched by the shutter using the shutter position indicator defined by a predetermined Equation. Thus, even when output of the rotary encoder for detecting a position of the shutter is affected by noise, it is possible to minimize such affection, realizing to assuredly determine whether the shutter pinches the disk. Constituent elements that include the same configurations as those of the embodiment and the modification examples can realize the same effects as those of the embodiment and the modification examples.

INDUSTRIAL APPLICABILITY

As described above, a shutter control device, a disk device, and a disk pinch determination computer program of the present invention are suitable for a disk device that includes equipments in a body, and particularly, for determining whether a shutter pinches a disk.

The invention claimed is:

1. A disk device comprising:
a disk insertion slot from which a disk is inserted into a disk driving unit that rotates the disk;
a shutter that opens and closes the disk insertion slot;
a shutter drive mechanism that opens and closes the shutter; and
a shutter control unit that determines whether the disk is pinched by the shutter based on positional information of the shutter while the shutter drive mechanism closes the shutter, and changes sensitivity of determination whether the disk is pinched by the shutter depending on a shutter operation parameter that defines mobility of the shutter.

2. The disk device according to claim 1, wherein when a moving distance of the shutter while the shutter drive mechanism closes the shutter is equal to or smaller than a predetermined distance, the shutter control unit determines that the disk is pinched by the shutter.

3. The disk device according to claim 1, further comprising a sensor that senses a temperature around the shutter drive mechanism as the shutter operation parameter.

4. The disk device according to claim 1, wherein the shutter control unit lowers the sensitivity as the temperature decreases.

5. The disk device according to claim 1, wherein the shutter control unit counts number of times determined that the disk is pinched by the shutter, and changes the sensitivity depending on the number of times.

6. The disk device according to claim 5, wherein the shutter control unit lowers the sensitivity when the number of times exceeds a predetermine number.

7. A disk device comprising:
a disk insertion slot from which a disk is inserted into a disk driving unit that rotates the disk ;
a shutter that opens and closes the disk insertion slot;
a shutter drive mechanism that opens and closes the shutter; and
a shutter control unit that determines whether the disk is pinched by the shutter based on positional information of the shutter while the shutter drive mechanism closes the shutter, counts number of times determined that the disk is pinched by the shutter, and changes sensitivity of determination depending on the number of times.

8. The disk device according to claim 7, wherein the shutter control unit lowers the sensitivity of determination when the number of times exceeds a predetermine number.

9. A shutter control device that controls a shutter drive mechanism for opening and closing a shutter whereby opening and closing a disk insertion slot from which a disk is inserted into a disk driving unit that rotates the disk, the shutter control device comprising:
a pinch determining unit that determines whether the disk is pinched by the shutter based on positional information of the shutter while the shutter drive mechanism closes the shutter; and
a sensitivity changing unit that changes sensitivity of determination by the pinch determining unit based on a shutter operation parameter that defines mobility of the shutter.

10. The shutter control device according to claim 9, further comprising a sensor that senses a temperature around the shutter drive mechanism as the shutter operation parameter, wherein
the sensitivity changing unit raises the sensitivity as the temperature increases.

11. The shutter control device according to claim 9, further comprising a counting unit that counts number of times determined by the pinch determining unit that the disk is pinched by the shutter exceeds a predetermine number, wherein
when the number of times exceeds a predetermine number, the sensitivity changing unit lowers the sensitivity.

12. A shutter control device that controls a shutter drive mechanism for opening and closing a shutter whereby opening and closing a disk insertion slot from which a disk is inserted into a disk driving unit that rotates the disk, the shutter control device comprising:
a pinch determining unit that determines whether the disk is pinched by the shutter based on positional information of the shutter while the shutter drive mechanism closes the shutter; and
a sensitivity changing unit that lowers sensitivity of determination by the pinch determining unit when number of times determined by the pinch determining unit that the disk is pinched by the shutter exceeds a predetermine number.

13. A computer-readable recording medium that stores therein a computer program that causes a computer to determine whether a disk is pinched by a shutter when a shutter drive mechanism closes the shutter, the shutter being arranged in a disk device for opening and closing a disk insertion slot from which the disk is inserted into a disk driving unit that rotates the disk, the computer program causing the computer to execute:
changing sensitivity that is used for determining whether the disk is pinched by the shutter based on a shutter operation parameter that defines mobility of the shutter.

14. The computer-readable recording medium according to claim 13, further comprising sensing a temperature around the shutter drive mechanism, wherein
the changing includes raising the sensitivity as the temperature increases.

15. The computer-readable recording medium according to claim 13, further comprising:

counting number of times determined that the disk is pinched by the shutter; and determining whether the number of times exceeds a predetermined number, wherein when the number of times exceeds the predetermine number, the changing includes lowering the sensitivity.

16. A computer-readable recording medium that stores therein a computer program that causes a computer to determine whether a disk is pinched by a shutter when a shutter drive mechanism closes the shutter, the shutter being arranged in a disk device for opening and closing a disk insertion slot from which the disk is inserted into a disk driving unit that rotates the disk, the computer program causing the computer to execute:

counting number of times determined that the disk is pinched by the shutter;

determining whether the number of times exceeds a predetermined number; and lowering sensitivity that is used for determining whether the disk is pinched by the shutter.

* * * * *